Aug. 10, 1926.  1,595,293
J. P. A. M. DE S. MARTIN
TRACTION INSTALLATION WITH DIRECT CURRENT MOTOR
Filed Dec. 12, 1923    3 Sheets-Sheet 1

Jacques Paul Antoine Minette De Saint Martin
INVENTOR

By
his ATTY.

Jacques Paul Antoine Minette De Saint Martin
INVENTOR

By *[signature]*
his ATTY.

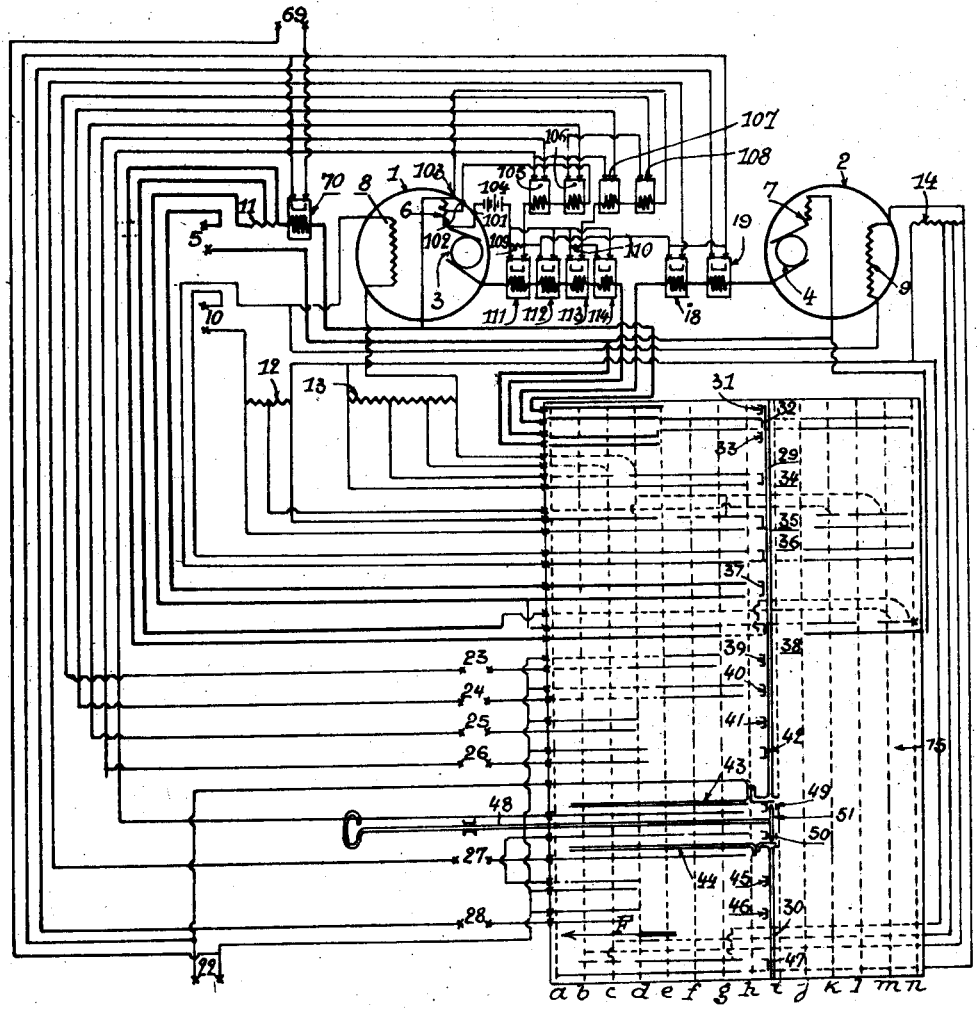

Patented Aug. 10, 1926.

1,595,293

UNITED STATES PATENT OFFICE.

JACQUES PAUL ANTOINE MINETTE DE SAINT MARTIN, OF PARIS, FRANCE, ASSIGNOR TO LA TRACTION ELECTRIQUE RATIONNELLE, OF PARIS, FRANCE.

TRACTION INSTALLATION WITH DIRECT-CURRENT MOTOR.

Application filed December 12, 1923, Serial No. 680,106, and in France March 12, 1923.

My invention relates to a traction system of control employing direct current electric motors, which is chiefly characterized in that it consists of a combination of overload and underload relays controlled by the current flowing through said motors, with a multiple controller.

Other features of the invention will be clearly set forth in the following description:

The said traction system of control offers various advantages, and in the first place it provides for an automatic regulation of the speed in relation to the torque. On the other hand, between the limits of the automatic regulation for a given connection of the armatures, the value of the current is maintained substantially constant. It is also feasible to recuperate energy when slowing up and when on a down grade, and electric braking can further be obtained, and one may also provide for the regulation of the slowing of the motor speed in accordance with a given value. Lastly, the motor speed may be reduced without placing resistances in the armature circuits.

In the appended drawings which are given by way of example:

Fig. 5 shows an arrangement whereby the relays can be made more responsive to current variations.

Figure 1:
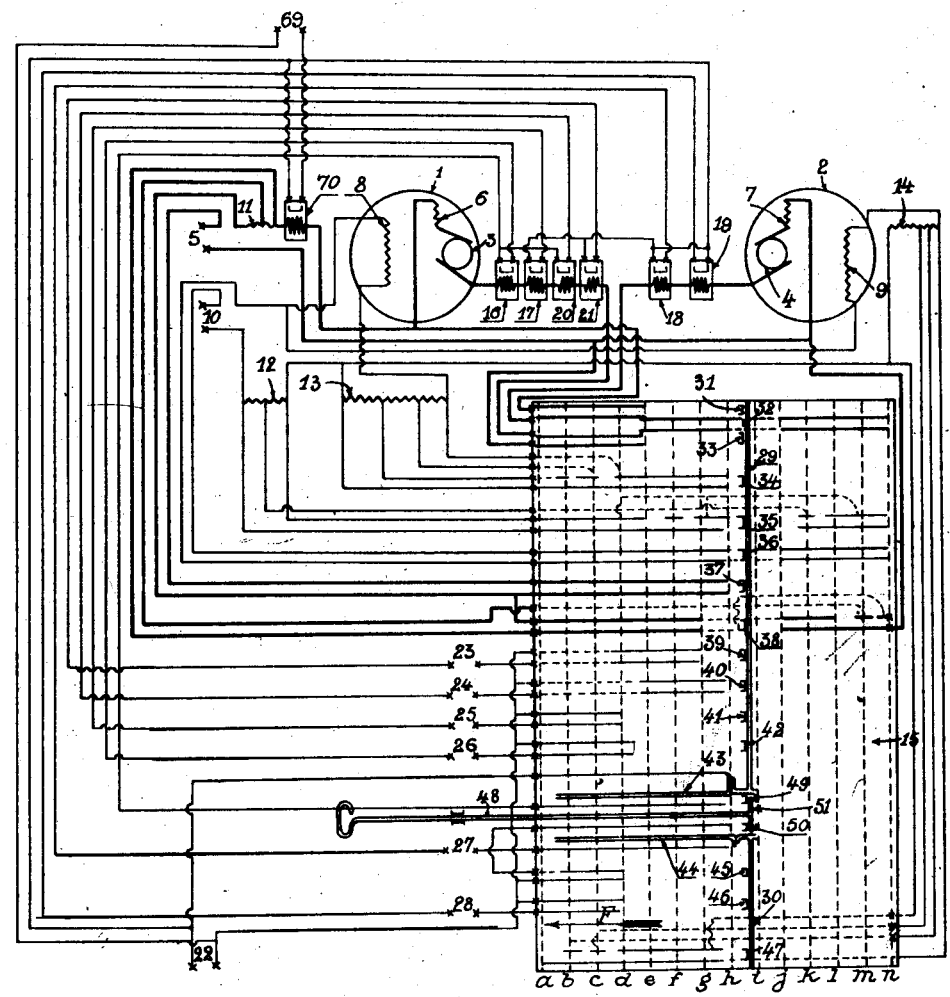
Fig. 1 is a diagram illustrating an embodiment of the traction system of control according to the invention for a group of two motors.

Fig. 1 shows diagrammatically an arrangement of circuits for a group of two motors, which according to the invention provides for the automatic regulation of the torque and speed with respect to the speed at will by recuperation or by absorption of energy in a resistance. The armatures 3, 4 of the motors 1, 2 are supplied by a source of current 5; 6 and 7 are the auxiliary poles in common use with all classes of direct current motors; 8 and 9 are the fields supplied by a source of current 10 which may be different from the source 5; 11 is a starting resistance; 12 is a variable resistance placed in the circuit of the fields 8 and 9 when the armatures 3 and 4 are connected in series. The variable resistances 13 and 14 are used for modifying the field current during the parallel working of the motors 1 and 2 and are inserted in the respective circuits of the fields 8 and 9.

A double controller 15, whose semi-automatic operation will be explained below, acts according to the position of its movable contact pieces to connect the armatures 3 and 4 in series or in parallel, and to vary by means of the resistances 12, 13, 14 the current in the fields 8, 9 in order to obtain the desired speeds.

16, 18 and 20 are the underload relays and 17, 19 and 21 are the overload relays. The relays 16, 17 are controlled by the current of the motor 1. The underload relay 18 and the overload relay 19 are controlled by the armature current of the motor 2. The underload relay 20 and the overload relay 21 are also connected to the circuit of the motor 1 and to the circuit of the motors 1 and 2 when the latter is in series with the motor 1. All these relays are polarized and act only by the current supplied to the motors.

According to the position of the movable contact elements of the controller 15, the various relays will ensure the closing of the circuits supplied by a suitable source of current 22 and connected to the terminals 23, 24, 25, 26, 27, 28. The terminals 23, 24, 25, 26 are connected with the windings of a double electro-magnetic clutch, shown in Fig. 2, which controls one of the movable sectors 29 of the controller 15 acting upon the motor 1. The terminals 27, 28 are connected to the windings of a second and like clutch (not shown) which controls another movable sector 30 of the controller 15 acting upon the motor 2.

The sectors 29, 30 may, in the present example, have the positions shown diagrammatically at $a, b, c, d, e, f, g, h, i, j, k, l, m, n$. The sector 29 is provided with the contacts 31, 32, 33, 34, 35, 36, 37, 38, 39, 40, 41, 42, 43. The sector 30 carries the contacts 44, 45, 46, 47.

The sectors 29, 30 may be displaced by a mechanism which is operated at will by a rod 48; in the positions $h, i, j, k, l, m, n$, the rod 48 is removably connected with the sector 29 by suitable mechanical means. In the positions $d, e, f, g, h, i, j, k, l, m, n$ the sector 30 is connected with the rod 48.

In the positions $a, b, c, d, e, f, g$, for the sector 29, and $a, b, c$, for the sector 30, the movement of 29 and 30 will be automatic in the direction of the arrow F, whilst it is either automatic or hand controlled in the inverse direction. The automatic movement according to the arrow is obtained by the working of the underload relays; the automatic movement in the inverse direction is obtained by the working of the overload relays, and this latter movement can also be had at will by the control rod 48, which, by means of the tappet 51, impels the sectors 29 and 30. Upon the tappet 51 are mounted the contact pieces 49 and 50 which serve to break the circuits of the underload relays 16, 18, 20 when the tappet 51 impels the sectors 29 and 30 in the direction contrary to the arrow F.

Figure 2:
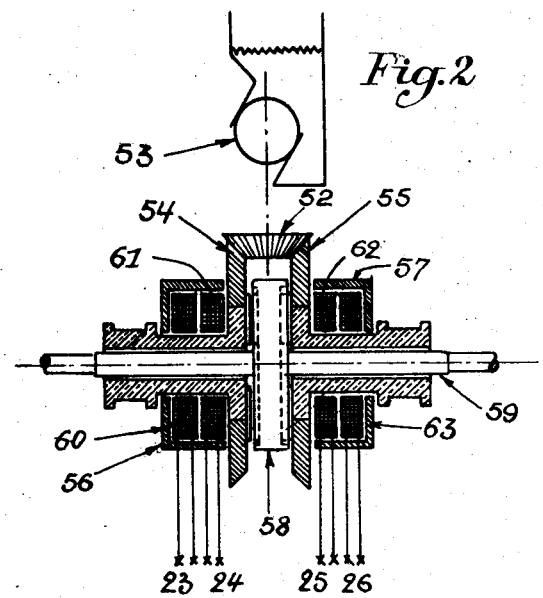
Fig. 2 is an axial section of the double electro-magnetic clutch used in the system of control.

The underload relays acting through the double clutch shown in Fig. 2, operate the sectors 29 and 30 according to the arrow, and the overload relays perform this operation in the contrary direction.

The above-described arrangement works in the following manner:

Starting from the position $i$ (no current in any of the parts) the rod 48 is moved in the direction of the arrow F so as to bring the tappet 51 into the position $a$. By reason of the above-mentioned mechanical coupling, the sector 29 is at first brought to $h$ and the sector 30 to $d$. It is only from these positions onward that the automatic regulating means can bring the sectors 29 and 30 into the position $a$.

In the positions $h$ for the sector 29 and $d$ for the sector 30, the field resistances 12, 13, 14 are shunted by the contacts 34, 35, 47. The starting resistance 11 is connected in the circuit of the armatures; the armatures 3 and 4 are connected in series by the contact 32, and the contact 37 connects the source of current 5 with the circuit of the armatures. In the position $h$, the minimum relay 20 can alone act upon the clutch controlling the sector 29 so as to move the latter in the direction of the arrow, the circuit of this relay being closed by the contacts 49, 43, 40.

The current which is gradually reduced will reach a value capable of operating the relay 20, thus moving the sector 29 which reaches the position $g$ for which the starting resistance 11 is shunted by the contact 38. Due to the elimination of the resistance 11 the current will increase, and the underload relay 20 may cease to work for a certain time. When the current again decreases and the relay 20 again operates, the sector 29 will move forward to $f$ and then to $e$, each position corresponding to an increase of speed from the fact that the resistance 12 is connected in the field circuits by the contact 35.

From the position $e$ onward, the armatures are connected in parallel by the contacts 31 and 33 and the resistance 12 is also shunted. From this time onward, should the resisting torque decrease, the relay 16 (adjusted for less current than the relay 20) comes into action to move forward the sector 29 to the position $a$; the circuit of the relay 16 will now be closed by the contact 42 whilst the circuit of the relay 20 is broken on the line of the contact 40.

The relay 18 acts in like manner to control the sector 30 which controls the exciting circuit of the motor 2.

To provide for the regular and reliable operation of the whole arrangement, a certain difference is allowed between the values of the current for which the overload and the underload relays are adjusted. As an example, to take a specific case, the relays 16 and 18 are adjusted for 100 amperes and the relays 17 and 19 will be regulated for 110 amperes; the relay 20 works at 200 amperes and the relay 21 at 220 amperes.

When the sectors 29 and 30 have the position $a$, if the resisting torque increases and the current in the motor exceeds 110 amperes, the relay 17 whose circuit is closed by the contact 41 will work and will move (through the clutch shown in Fig. 2) the sector 29 into the position $b$, thereby increasing the exciting current. The motor 2 will be subject to like conditions by the use of the overload relay 19. The variations of the resisting torque, causing successive variations in the current, may bring the sectors 29 and 30 into the respective positions $g$ and $d$, these positions corresponding to the maximum torque of the whole aggregate for the corresponding smallest power.

In this traction arrangement, between the limits of automatic working, the power taken by the whole installation will vary between known limits, these being determined by the adjustment of the relays and by their feasibility of action by means of the contacts 39, 40, 41, 42, 43, 44, 45, 46, 49, 50 upon the controlling element of the controller.

The speed obtained by the automatic regulation can be reduced by means of the rod 48 which is operated at will; when the said rod is moved in the direction contrary to the arrow F, it will break the circuit which was closed by the overload relays, as shown by the position of the contacts 49 and 50 when the tappet 51 pushes the sectors 29 and 30. The increase in the field circuit, or the series connection, caused by this movement will cause a recovery of energy as far as the position h.

From the position h to the position n, the sectors 29 and 30 may be operated in either direction by the rod 48; in these positions (h to n) the rod is secured to the contact elements 29 and 30 as above said. In the positions j to n the dynamos 1 and 2 work as generators and exercise a braking action upon the whole arrangement in a gradual manner. In this case the machines are excited by the source of current 10 by the use of the contacts 35 and 36. The contacts 32 and 38 serve to connect the armatures to the starting resistance 11. The exciting current as well as the starting resistance can be varied, as shown by the connections of the controller 15.

Fig. 2 shows a constructional form of the arrangement serving to control the sectors 29, Fig. 1, by means of a double electro-magnetic clutch. A bevel gear 52 is driven by a servo-motor 53 or by any suitable rotating element of the traction plant; the said gear drives two bevel gears 54, 55 rotating in contrary directions. Two electro-magnets 56, 57 serve to drive a disc 58, keyed to the shaft 59, by means of the gear 54 or the gear 55. The shaft 59 controls the sector 29 (Fig. 1) by suitable means.

Each electro-magnet comprises two windings 60, 61 for the electro-magnet 56 and 62, 63 for the electro-magnet 57. The windings of the electro-magnet 56 are supplied through the underload relays 16 and 20 (Fig. 1), by the use of the terminals 24 and 26 (Fig. 1). The windings of the electromagnet 57 are supplied through the oveload relays 17 and 21 (Fig. 1) by the use of the terminals 23 and 25 (Fig. 1). When none of the relays is working, the shaft 59 is stationary. If one of the underload relays is energized the disc 58 is attracted towards the wheel 54, and the shaft 59 moves forward the sector 29 in the direction of the arrow F (Fig. 1). The electro-magnet 57 supplied through the overload relays will cause the disc 58 to be attracted towards the wheel 55, and the shaft 59 will rotate in the contrary direction.

The sector 30 (Fig. 1) is actuated by a like clutch device differing from the one shown in Fig. 2 only as concerns the electro-magnets which comprise but a single winding for each, the same being supplied at one end by the terminals 27 (Fig. 1) and at the other end by the terminals 28 (Fig. 1).

Figure 3:
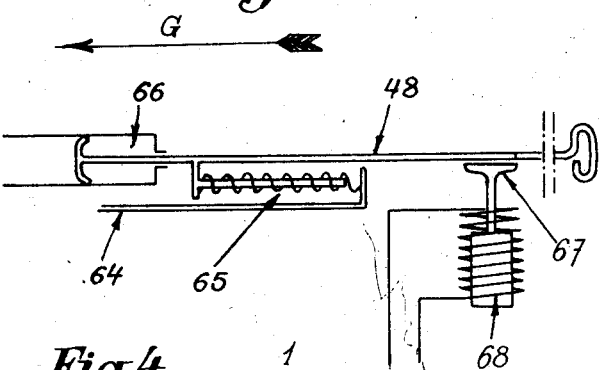
Fig. 3 is a diagrammatic view of the device which may be employed with the hand-controlled means for limiting the slowing of the motors.

Fig. 3 shows a device which may be used with the control rod 48 (Fig. 1) whereby the slowing of the motor speed may be limited to a given value, i. e. the rate of slowing of the motors is limited, so that they will proceed only at a given rate from a determined speed to a slower speed. Between the rod 48 and the positive control 64 is disposed the spring 65 which acts only in the direction contrary to the arrow G. The rod 48, or its control, is secured to a dash-pot or like device 66 of a known type which acts only in the direction contrary to that of the arrow.

The rod 48 (or its control) may also be braked by the member 67 controlled by the electro-magnet 68 whose winding is connected to the terminals 69 of the overload relay 70 (Fig. 1) which is energized only by the current furnished by the machines 1 and 2 working as generators.

All rapid movements of the positive control 64 in the direction contrary to that of the arrow will produce a tension of the spring 65, the dash-pot 66 preventing all rapid motion of the rod 48 in this direction. If in spite of this slowing of the movement of the rod 48 the braking action is too strong, and the current produced by the dynamos exceeds the current for which the relay 70 is adjusted, the electro-magnet 68 will work and temporarily hold the rod 48 until the current becomes reduced and reaches the value for which the relay 70 ceases to work.

The arrangement shown in Fig. 3 can be used to limit the reduction of the motor speed to a given value, employing for this purpose an overload relay 70, which works only upon current furnished by the machines 1 and 2.

Figure 4:
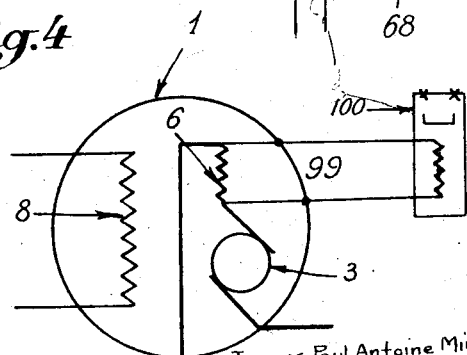
Fig. 4 shows diagrammatically a detail view of a modified arrangement for the supply of the said maximum and minimum relays.

Fig. 4 is a diagrammatic view showing an arrangement whereby the overload and underload regulating relays, can be constructed with greater facility and will occupy a reduced space. In this case the relays are disposed in a circuit whose ends are connected to two different points of the windings of the auxiliary poles of the motors.

In Fig. 4, 1 is one of the motors of the traction system of control; its armature is shown at 3, and the winding of the auxiliary poles 6 is in series with the armature 3; the main poles are shown at 8; the terminals 99 are connected to the ends (or to a portion) of the auxiliary coils, and these terminals 99 are connected with the coils of the overload and underload relays serving the same purpose as these shown in Fig. 1, a relay of this type being shown at 100 in Fig. 4.

The regulating relays shown in Figs. 1 and 4 serve to maintain between the limits of the adjustment—for a given coupling of the armature either in series or in parallel—currents in the armatures which vary between relatively restricted limits.

According to the invention, each relay is adjusted to work for a predetermined value of the current which controls it. For the sake of clearness, let it be admitted that the relay 16 is adjusted for 100 amperes, the relay 17 for 110 amperes, the relay 20 for 200 amperes, the relay 21 for 220 amperes, the relay 19 for 110 amperes and the relay 18 for 100 amperes; these relays operate only upon one direction of the current, or the current for which the dynamos 1 and 2 operate as motors.

Difficulties may be met within the construction and regulation of these relays in order to obtain the required sensitiveness, and the arrangement illustrated in Fig. 5 provides for a more responsive action upon the variations of current. It is here represented as employed for only a single motor of the plant.

To this end the relays instead of being energized by the whole current of the armatures Fig. 1 or by a part of the armature current which is always proportional to the whole current (Fig. 4), are supplied by a circuit in which a practically constant E. M. F. is made to oppose the difference of potential produced by the flow of current in the whole or a part of the winding of the auxiliary poles.

In Fig. 5, the armature 3 of the motor 1 is in series with the winding of the auxiliary poles 6. The winding 6 is connected to the terminals 101, 102, 103. A source of constant E. M. F. is shown at 104. The overload and the underload regulating relays which act during the series working of the armatures are shown respectively at 106 and 105. The regulating relays for the parallel working are shown at 107 (underload relay) and 108 (overload relay).

The relays 105 and 106 are disposed in the circuit in which the E. M. F. 104 is opposed to the difference of potential 101—102. The relays 107 and 108 are placed in the circuit in which the E. M. F. 104 is opposed to the difference of potential 101—103.

The resistances 109, 110 are mounted respectively in the circuit of the relays 105, 106 on the one hand and 107, 108 on the other hand; these resistances can be shunted by less sensitive relays i. e. underload relays 111 and 113, and overload relays 112, and 114.

For greater clearness let it be admitted as in the preceding examples that when the armatures are connected in series, between the limits of the automatic regulation, the current will be maintained between 200 and 220 amperes, whilst in the corresponding parallel working, the current is between 100 and 110 amperes. The mean current for the series working will thus be 210 and for the parallel working 105 amperes.

The E. M. F. 104 is such that it balances the potential difference 101—103 when the current in the armature is 105 amperes. The connection between the auxiliary winding and the terminal 102 is such that this E. M. F. will balance the potential difference 101—102 when the current in the armature is 210 amperes. In this example the resistance 109 is shunted by the relay 111 when the current falls below 200 amperes and attains for instance 180 amperes; this resistance is also shunted by the relay 112 when the current rises above 220 amperes and attains for instance 240 amperes. The resistance 110 is shunted by the relay 113 when the current is below 100 amperes and reaches for instance 90 amperes, and is shunted in like manner by the relay 114 when the current rises above 110 amperes and attains for instance 120 amperes.

With the current at 105 amperes no current will pass in the coils of the relays 107, 108. When the current diminishes and is at 100 amperes, the potential difference 101—103 will have also decreased and a certain amount of current will pass in a certain direction through the coils of the relays 107, 108 and will cause the relay 107 to work exclusively. Should the current increase as far as 110 amperes, the potential difference 101—103 will be greater than the E. M. F. 104 and a certain amount of current will pass in the opposite direction through the coils of the relays 107, 108 and will cause only the polarized relay 108 to work.

The resistance 110 which is shunted when the relays 107, 108 operate, serves solely to limit the current in the coils of the relays 107, 108 when the current in the armatures reaches a value which will operate the auxiliary relays 113, 114 i. e., in this example, when the current in the armatures is above 120 amperes and below 90 amperes.

In the regulation for the series working of the armatures, i. e. from 200 to 220 amperes in this example when the current is 210 amperes, no current will pass in the coils of the relays 105, 106. If the current decreases to 200 amperes, the potential difference 101—102 will also diminish and a certain amount of current will pass through the relays 105, 106 thus operating the underload relay 105 exclusively. If the current increases and reaches 220 amperes, an inverse current will pass through the relays 105, 106, and the overload relay 106 will be alone operated. The resistance 109 which is shunted when the relays 105 and 106 operate will limit the current in these latter relays by means of the auxiliary relays 111, 112 when the armature current is below 180 amperes and above 240 amperes. The relays 111, 112, 113, 114 may be energized either by the total current of the armature as is the case for the relays 16, 17, 20, 21 Fig. 1 or by a part of this current as in Fig. 4.

From the preceding description as a whole, it will result that in the traction system of control according to the invention, the current in the motors will be practically constant between the limits of the regulation, for a given coupling of the armatures. The motor speed is limited in all cases, either by the automatic regulation or by a control effected, at will, to a value corresponding practically to the value of the current in the armatures. Braking by recuperation is easily obtained, and braking as far as stopping is electrically obtained.

The general size and the main constructive elements of the usual series traction motors can be kept and used without difficulty.

Having now described my invention what I claim as new and desire to secure by Letters Patent is:

1. An electric traction system of control embodying direct current motors, resistances adapted to be coupled with the armature and field circuits of said motors, a controller comprising movable contact carrying members adapted to control the coupling and uncoupling of said resistances in series with the armature and field circuits of said motors and the coupling and uncoupling of said armatures in series or in parallel connection, overload relays and underload relays adapted to be controlled by the current flowing through said motors, and means comprising double electro-magnetic clutches capable of driving separately said contact carrying members, each of said clutches being adapted to be operated in one direction by said overload relays and in the opposite direction by said underload relays.

2. An electric traction system of control embodying direct current motors, resistances adapted to be coupled with the armature and field circuits of said motors, regulating means capable of coupling and uncoupling said resistances in series with said armature and field circuits of said motors and of coupling and uncoupling said armatures in series or in parallel connection, and overload relays and underload relays adapted to be controlled by the current flowing through said motors and to operate automatically said regulating means, the overload relay and the underload relay pertaining to each motor and the overload relay and the underload relay pertaining to the group formed by the motors connected in series being adjusted to work every one respectively for a predetermined value of the current flowing through said motors.

3. An electric traction system of control embodying direct current motors, resistances adapted to be coupled with the armature and field circuits of said motors, regulating means capable of coupling and uncoupling said resistances in series with said armature and field circuits of said motors and of coupling and uncoupling said armatures in series or in parallel connection, and overload relays and underload relays adapted to be controlled by the current flowing through said motors, said relays being disposed in circuits whose ends are connected to different points of the windings of the auxiliary poles of the motors and adapted to operate automatically said regulating means.

4. An electric traction system of control embodying direct current motors, resistances adapted to be coupled with the armature and field circuits of said motors, regulating means capable of coupling and uncoupling said resistances in series with said armature and field circuits of said motors and of coupling and uncoupling said armature in series or in parallel connection, and overload relays and underload relays adapted to be controlled by the current flowing through said motors, said relays being disposed in circuits whose ends are connected to different points of the windings of the auxiliary poles of the motors, an auxiliary source of constant voltage being inserted in series with said relays, the voltage of said source being in opposition to that of the current controlling said relays, said relays being adapted to operate automatically said regulating means.

5. An electric traction system of control embodying direct current motors, resistances adapted to be coupled with the armature and field circuits of said motors, regulating means capable of coupling and uncoupling said resistances in series with said armature and field circuits of said motors and of coupling and uncoupling said armatures in series or in parallel connection, and overload relays and underload relays adapted to be controlled by the current flowing through said motors, said relays being disposed in circuits whose ends are connected to different points of the windings of the auxiliary poles of the motors, an auxiliary source of constant voltage being inserted in series with said relays, the voltage of said source being in opposition to that of the current controlling said relays, said relays being adapted to operate automatically said regulating means, additional resistances inserted in the circuits of said relays and auxiliary relays less responsive than the latter and adapted to shunt said additional resistances.

In testimony whereof I have signed my name to this specification.

JACQUES PAUL ANTOINE
MINETTE de SAINT MARTIN.